(12) United States Patent
Bishop et al.

(10) Patent No.: US 12,090,710 B2
(45) Date of Patent: Sep. 17, 2024

(54) PACKAGING APPARATUS AND METHOD

(71) Applicant: TATA CONSUMER PRODUCTS GB LIMITED, Greenford (GB)

(72) Inventors: Andrew John Bishop, Greenford (GB); Neal James McCabe, Greenford (GB); Gary Robinson, Wakefield (GB); John Francis McGowan, Wakefield (GB); Jason Shawn Lee Exley, Wakefield (GB)

(73) Assignee: TATA CONSUMER PRODUCTS GB LIMITED, Greenford (GB)

( * ) Notice: Subject to any disclaimer, the term of this patent is extended or adjusted under 35 U.S.C. 154(b) by 93 days.

(21) Appl. No.: 18/009,711

(22) PCT Filed: Jun. 11, 2021

(86) PCT No.: PCT/GB2021/051460
§ 371 (c)(1),
(2) Date: Dec. 9, 2022

(87) PCT Pub. No.: WO2021/250424
PCT Pub. Date: Dec. 16, 2021

(65) Prior Publication Data
US 2023/0241846 A1 Aug. 3, 2023

(30) Foreign Application Priority Data
Jun. 12, 2020 (GB) .................... 2008976

(51) Int. Cl.
*B65B 9/04* (2006.01)
*B29C 65/00* (2006.01)
(Continued)

(52) U.S. Cl.
CPC .... *B29C 66/83413* (2013.01); *B29C 65/1412* (2013.01); *B29C 65/245* (2013.01);
(Continued)

(58) Field of Classification Search
CPC ..... B65B 9/042; B65B 29/025; B65B 29/028; B65B 51/10; B65B 51/16; B65B 51/28;
(Continued)

(56) References Cited

U.S. PATENT DOCUMENTS

| | | | | |
|---|---|---|---|---|
| 2,773,773 A | * | 12/1956 | Harder et al. | ..... A22C 13/0003 156/218 |
| 3,929,553 A | | 12/1975 | van Kempen | |
| 4,609,556 A | * | 9/1986 | Goedert | .................. B65B 9/042 206/0.5 |
| 5,459,980 A | * | 10/1995 | Kenney et al. | ....... B65B 29/028 53/553 |

(Continued)

FOREIGN PATENT DOCUMENTS

| | | |
|---|---|---|
| DE | 6752876 | 3/1969 |
| EP | 0649796 | 4/1995 |

(Continued)

OTHER PUBLICATIONS

GB Application No. GB2008976.9 Search Report from Intellectual Property Office, Apr. 12, 2023.
(Continued)

*Primary Examiner* — Stephen F. Gerrity
(74) *Attorney, Agent, or Firm* — Kunzler Bean & Adamson

(57) ABSTRACT

Packaging apparatus comprises two counter-rotatable sealing dies for pressing together two tissue webs to produce pockets for containing a substance for preparing beverages and to seal around the pockets, and two heating drums for heating the sealing dies and each being positioned inside a respective sealing die, wherein a first heating zone of each heating drum comprises a first plurality of circumferentially distributed infrared heating elements, and a second heating zone of each heating drum comprises a second plurality of circumferentially distributed infrared heating elements.

20 Claims, 6 Drawing Sheets

(51) Int. Cl.
  *B29C 65/14* (2006.01)
  *B29C 65/24* (2006.01)
  *B65B 29/02* (2006.01)
  *B65B 51/16* (2006.01)
  *B65B 51/28* (2006.01)
  *B29L 31/00* (2006.01)
  *B65B 51/10* (2006.01)

(52) U.S. Cl.
  CPC .......... *B29C 66/433* (2013.01); *B29C 66/849* (2013.01); *B29C 66/91421* (2013.01); *B65B 9/042* (2013.01); *B65B 29/025* (2017.08); *B65B 29/028* (2017.08); *B65B 51/16* (2013.01); *B65B 51/28* (2013.01); *B29L 2031/7122* (2013.01); *B65B 2009/047* (2013.01); *B65B 2051/105* (2013.01)

(58) Field of Classification Search
  CPC ........ B65B 2009/047; B65B 2051/105; B29C 65/1412; B29C 66/83413; B29L 2031/7122
  USPC .................................................... 53/450, 553
  See application file for complete search history.

(56) References Cited

U.S. PATENT DOCUMENTS

| | | | |
|---|---|---|---|
| 5,826,403 A | 10/1998 | Haley | |
| 2002/0096984 A1* | 7/2002 | Konishi et al. | .......... H01K 1/06 |
| | | | 313/25 |

FOREIGN PATENT DOCUMENTS

| | | | |
|---|---|---|---|
| EP | 1918207 | 5/2008 | |
| JP | 3681857 B2 * | 8/2005 | |
| KR | 1966860 B1 * | 4/2019 | ......... B32B 37/0053 |
| WO | 9013487 | 11/1990 | |
| WO | WO-2005068857 A1 * | 7/2005 | ....... B29C 66/83413 |
| WO | 2006084805 | 8/2006 | |

OTHER PUBLICATIONS

PCT Application No. PCT/GB2021/051460 International Search Report and Written Opinion of the International Search Authority, Aug. 17, 2021.
GB Application No. GB2008976.9 Search Report from Intellectual Property Office, Oct. 27, 2020.

* cited by examiner

PACKAGING APPARATUS AND METHOD

The technology described herein relates to packaging apparatus and a method for packaging a substance for preparing beverages, such as tea bags.

During the manufacture of tea bags, using two tissue webs which are brought together between sealing dies, the tea bags are heat sealed around the outside to prevent the tea leaves from leaking out. This step of heat sealing comprises applying pressure and heat to the tissue around the edges of the tea bag to melt a plastic bonding agent such as polypropylene and create a bond between the two tissue webs. The quality of the seal is dependent on three key process variables—pressure, temperature and time. Tight control of these process variables is critical to providing an effective seal which will not break and leak when the tea bag is used by the consumer.

In a production line this procedure is conventionally performed by counter-rotating sealing dies, into which two pieces of tissue webs are fed to be sealed together. Each rotating sealing die is heated by an independent heating element drum. The heating drums each comprise an array of ceramic infrared heating elements that are controlled to maintain the sealing temperature of the sealing die. However, these conventional systems are generally only able to maintain the sealing temperature with a tolerance of +/−20° C. Furthermore, the inventors of the technology described herein observed that some conventional systems also have a temperature variation, of up to 30° C., along the length of the sealing die.

A first embodiment comprises packaging apparatus comprising two counter-rotatable sealing dies for pressing together two tissue webs to produce pockets for containing a substance for preparing beverages and to seal around said pockets, and two heating drums for heating the sealing dies and each being positioned inside a respective sealing die, wherein a first heating zone of each heating drum comprises a first plurality of circumferentially distributed infrared heating elements, and a second heating zone of each heating drum comprises a second plurality of circumferentially distributed infrared heating elements.

A second embodiment comprises a method for packaging a substance for preparing beverages, the method comprising: counter-rotating two sealing dies; heating, by a respective heating drum, each one of said two counter-rotating sealing dies; pressing, by the two counter-rotating sealing dies, two tissue webs together to produce pockets for containing the substance; and sealing, by the two counter-rotating sealing dies, around the outside of said pockets; wherein a first heating zone of each heating drum comprises a first plurality of circumferentially distributed infrared heating elements, and a second heating zone of each heating drum comprises a second plurality of circumferentially distributed infrared heating elements.

This arrangement allows the first heating zone and second heating zone to be independently controlled to more precisely control the temperature of each sealing die. This increase in control can provide a more uniform temperature distribution on the surface of the sealing die, resulting in an improved seal.

Additionally, the duration of time in which heat is applied to the seal is inversely proportional to the speed at which the sealing dies rotate. At high speeds the bonding agent is heated for only a short period of time and so any variation of the temperature of the sealing dies becomes more significant to the integrity and strength of the seal. Therefore, the speed of production may be increased as a result of better control of the temperature distribution of the sealing die.

The substance for preparing beverages may comprise tea leaves. Accordingly, the apparatus and method may be for the production of tea bags.

In an embodiment, the method comprises using a bonding agent to be heated to seal around the pockets. An exemplary bonding agent is polypropylene. At least one of the two tissue webs comprises polypropylene.

More recently, it has become desirable to use eco-friendly and/or biodegradable plastics, such as polylactic acid (PLA), as the bonding agent in the seals of tea bags. However these types of bonding agents are not as strong as polypropylene which is conventionally used in some machines. A further benefit of better control of the temperature distribution on the sealing die is the ability to ensure an effective seal even when using biodegradable bonding agents.

In an embodiment, the method comprises using a biodegradable bonding agent to be heated to seal around the pockets. An exemplary bonding agent is polylactic acid (PLA). At least one of the two tissue webs comprises polylactic acid.

Each heating drum may have more than two heating zones, with a corresponding plurality of circumferentially distributed infrared heating elements belonging to each heating zone. For example, there may be third, fourth etc. pluralities of circumferentially distributed infrared heating elements forming respective third, fourth etc. heating zones.

In an embodiment the infrared heating elements in the second plurality of circumferentially distributed infrared heating elements are axially offset from the infrared heating elements in the first plurality of circumferentially distributed infrared heating elements.

As used herein, 'axially offset' may mean completely offset parallel to a central longitudinal axis of the heating drum, such that the lengths of the infrared heating elements of each zone do not overlap in a circumferential direction. However 'axially offset' may also mean partially offset parallel to the central longitudinal axis of the heating drum, such that the lengths of the infrared heating elements of each zone partially overlap. Although more heat may be generated where the heating elements overlap, this may not be in a critical area of the heating drum, for example not radially adjacent to a portion of the sealing die where pockets are formed.

An axial offset of the heating elements of the first and second heating zones allows for better control of the temperature distribution along the length of the sealing die. In conventional systems, the machinery responsible for the support and rotation of the sealing dies acts to conduct heat away from the sealing die at the end to which it is operatively connected, i.e. it acts as a heat sink. This results in a temperature gradient/variation being set up along the length of the sealing die. A similar effect may result from the sealing die having different thermal properties over its length, such as a greater thickness in one part compared to another. By allowing the heat being supplied to the sealing die to also vary along the length of the sealing die, the heat flow can be balanced and a uniform temperature distribution can be achieved along the sealing die.

In an embodiment, the infrared heating elements in the second plurality of circumferentially distributed infrared heating elements are circumferentially offset from the infrared heating elements in the first plurality of circumferentially distributed infrared heating elements.

This arrangement allows the first and second plurality of circumferentially distributed heating elements to be more compact.

The arrangement can also allow an efficient positioning of electrical connections, such as wires, to the heating zones. The electrical connections to each of the plurality of circumferentially distributed heating elements, for example the second plurality, may extend between spaces between circumferentially adjacent heating elements of another plurality of circumferentially distributed heating elements, for example the first plurality. This can reduce the space occupied by the heating drum in a radial direction.

The electrical connections may be protected by ceramic beads and/or supported by a supporting structure. The ceramic beads can provide high temperature protection of the electrical connections.

The electrical connections, such as wires, may extend into the heating zones from terminals, which may be ceramic high-temperature connection blocks.

The sealing dies may be made of a high emissivity material (e.g. anodised aluminium).

The packaging apparatus may comprise a temperature control system, wherein the temperature control system is configured to independently control the first and second plurality of circumferentially distributed infrared heating elements. The method may comprise independently controlling, by a temperature control system, the first and second plurality of circumferentially distributed infrared heating elements.

The temperature control system can independently control the first and second plurality of circumferentially distributed infrared heating elements in order to adjust the heating of the first and second heating zones during operation. If the heating effect on a sealing die varies, for example along the length of the sealing die, the independent control can operate to maintain a uniform temperature profile, for example along the sealing die. Variation can be caused as discussed above, by the heat sink effect of other parts of the apparatus or by variations in thickness of a sealing die.

The temperature control system may be configured to control the first and second plurality of circumferentially distributed infrared heating elements such that a heat output from one of said pluralities is greater than a heat output from the other of said pluralities.

The packaging apparatus may comprise a temperature sensor arranged to measure the temperature at a location on at least one of the sealing dies heated by the second plurality of circumferentially distributed infrared heating elements during rotation of the sealing die and production of said pockets, and wherein the temperature control system is configured to control the output of the first and second pluralities of circumferentially distributed infrared heating elements of the sealing die based on temperature measurements taken by the temperature sensor. The method may comprise measuring the temperature at a location on at least one of the sealing dies heated by its associated second plurality of circumferentially distributed infrared heating elements during rotation of the sealing die and production of said pockets, and the temperature control system controlling the output of the first and second pluralities of circumferentially distributed infrared heating elements of the sealing die based on the temperature measurements taken by the temperature sensor. The temperature sensor can thus take temperature measurements in real time while the sealing die rotates during production of the pockets.

The inventors have recognised that even when more than one heating zone is provided, it is possible precisely to control the temperature profile of the sealing die using the real-time temperature measurements at just one location on the sealing die. If the temperature profile of the sealing die in response to the heat output from the first and second pluralities of heating elements is known, then temperature measurements at a single position during operation can be sufficient for the temperature control system to appropriately control the output of both the first and second pluralities of heating elements.

The temperature measurements may be combined with a temperature distribution model in order to determine the real-time temperature distribution on the surface of the sealing die. The temperature distribution model may be established by suitable testing, such as taking pre-measurements during a setup phase. The temperature control system may use this information to provide more accurate and uniform control of the temperature of the sealing die.

The temperature sensor may be located at a fixed position on a respective sealing die so as to rotate with the sealing die during production of the pockets. It may for example be a thermocouple. Alternatively, the temperature sensor may be an infrared sensor not in physical contact with the sealing die, so that it remains stationary as the sealing die rotates.

The temperature control system may be configured to control the output of the first and second plurality of circumferentially distributed infrared heating elements of a respective sealing die by using temperature measurements taken at plural locations along the length of the sealing die. The method may comprise taking temperature measurements at plural locations along the length of the sealing die, and the temperature control system controlling the output of the first and second plurality of circumferentially distributed infrared heating elements of the sealing die by using said temperature measurements taken at said plural locations.

The temperature measurements taken at these lengthwise spaced locations may be taken by providing more than one temperature sensor at the respective locations, in real time during operation of the apparatus. These may be provided at fixed positions on a respective sealing die, e.g. using thermocouples, or they may be infrared sensors not in physical contact with the sealing die. However, as discussed above, measurements at lengthwise spaced locations may not be necessary. Moreover, in the case of temperature sensors fixed to the sealing die, it may be difficult to connect more than one temperature sensor to the temperature control system during rotation of the sealing die, because usually a single wired connection along the axial centre of the sealing die to an axially centrally positioned mercury electrical connector is used.

To avoid this difficulty, the temperature measurements taken at the locations along the length of the sealing die may be taken in a setup phase, before the apparatus is operating to produce the pockets for containing the substance.

The temperature measurements taken at plural locations along the length of the sealing die and used by the temperature control system may be pre-measurements taken during a setup phase, and the temperature measurement system may be configured to control the output of the first and second plurality of circumferentially distributed infrared heating elements by using the pre-measurements.

The method may further comprise conducting a set up phase in which pre-measurements are taken, wherein the temperature measurements taken at plural locations along the length of the sealing die and used by the temperature control system are the pre-measurements taken during the setup phase, and the temperature measurement system controlling the output of the first and second plurality of circumferentially distributed infrared heating elements by using the pre-measurements.

Such a setup phase may involve taking temperature measurements while the sealing dies are rotating. However, in an embodiment, the sealing dies are rotated and heated for a period, for example 2-3 minutes, and then when they have come to rest the temperature at the plural locations along the length of the sealing die is measured. For example one or more infrared temperature sensors may be used. The sensor(s) may be positioned manually. In an embodiment, the setup phase comprises: counter-rotating the two sealing dies; heating, by the heating drums, the counter-rotating sealing dies; and taking the pre-measurements at said plural locations when the sealing dies are stationary.

If the setup phase involves more than one setup step, using different heat output parameters for the first and second plurality of circumferentially distributed infrared heating elements, it is desirable that the locations where the temperature is measured are the same each time, thereby eliminating discrepancies due to local variations in emissivity or surface roughness or cleanliness. Thus a temperature distribution model may be established.

At least one of the pluralities of circumferentially distributed infrared heating elements may be sub-divided into sub-pluralities. For example, if a plurality of heating elements consists of eight heating elements, this may be made up of two groups of four heating elements. In an embodiment, a first sub-plurality may be connected in series, and a second sub-plurality may be connected in series. If one heating element in a sub-plurality fails, this will produce a current reduction corresponding to the consumption of all the heating elements of that sub-plurality, which may be easily detected.

The infrared heating elements may each comprise a short wave carbon infrared element in a quartz glass tube.

A third embodiment comprises a packaging apparatus comprising two counter-rotatable sealing dies for pressing together two tissue webs to produce pockets for containing a substance for preparing beverages and to seal around said pockets, and two heating drums for heating the sealing dies and each being positioned inside a respective sealing die, wherein each heating drum comprises a plurality of circumferentially arranged infrared emitters, wherein the infrared emitters each comprise a short wave carbon infrared element in a quartz glass tube.

Quartz glass infrared emitters can transfer large amounts of energy at a greater rate than conventional heating sources. This fast response time allows the system to heat up almost immediately from cold with the application of power. Furthermore, the fast response time allows precise control of emitted heat, because when the power supplied to the heating drum is adjusted, for example in response to an output from the temperature control system, heat output from the heating drum is quickly increased or decreased as required.

In embodiments of the packaging apparatus and the packaging method, using plural heating zones for a given sealing die, and using infrared emitters comprising a short wave carbon infrared element in a quartz glass tube, a temperature variation within +/−3° C. on the entire surface of each sealing die can be achieved. This can provide a high rate of production of pockets containing a substance for preparing beverages, such as tea bags, for example a rate of 2800 pockets per minute using a pair of sealing dies.

Bio friendly sealing agents, such as polylactic acid (PLA), are sensitive to any temperature variations. A sufficient temperature is needed to melt the agent, but if the temperature is too high, the agent may leach through the tissue web to the sealing die. Therefore it is beneficial to achieve a precise control of the temperature of the sealing dies across their surfaces, in other words only a narrow range of variation compared to known systems in which the variation may be as much as +/−20° C.

The short wave carbon infrared element may be configured to emit infrared radiation with a wavelength in the range 0.7 µm-3.0 µm.

Quartz glass infrared emitters can be precisely matched to the materials to be heated, as the wavelength emitted (and subsequently absorbed) has a significant influence on the heating process. In this instance, short wave radiation may be utilised in the above range as short wave radiation is able to penetrate deep into solid materials, ensuring uniform through-heating.

The infrared element may have a temperature of approximately 2200° C.

In embodiments having a first heating zone comprising a first plurality of circumferentially distributed infrared heating elements, and a second heating zone comprising a second plurality of circumferentially distributed infrared heating elements, and the heating elements are short wave carbon infrared elements, it is particularly advantageous for the respective pluralities of heating elements to be sub-divided into sub-pluralities, with each sub-plurality being connected in series. As discussed above, this allows easy detection if one heating element in a sub-plurality fails, because this produces a current reduction corresponding to the consumption of all the heating elements of that sub-plurality.

The method may further comprise introducing said substance into the pockets to produce bags containing the substance. The substance may comprise tea leaves and the bags may be tea bags.

In conventional machines, the sealing dies are supported by cantilevered rotating shafts and have a nut which can be adjusted to change the pressure applied by a compression spring to the supported end of the shaft, so as to determine the amount of pressure exerted by the sealing dies on the tissue webs. The cantilever arrangement plus the adjustable nut allowed the pressure exerted by the sealing dies to be optimised to minimise the production of faulty teabags. With this conventional approach, the inventors have now recognised that there is a variation in pressure along the length of dies, which can lead to inadequate sealing of the teabags.

A fourth embodiment comprises a packaging apparatus comprising a pair of heated counter-rotatable sealing dies for pressing together two tissue webs to produce pockets for containing a substance for preparing beverages and to seal around said pockets, a pair of shafts, each shaft supporting a respective sealing die and extending from a first shaft end portion to a second shaft end portion, a pair of bearings, each bearing rotatably supporting one of the shafts at the first shaft end portion thereof, a first pressure device configured to act on one of the pair of shafts to provide a first control of the pressure exerted by the sealing dies on the tissue webs, and a second pressure device configured to act on at least one of the pair of shafts to provide a second control of the pressure exerted by the sealing dies on the tissue webs.

A fifth embodiment comprises a method for packaging a substance for preparing beverages, the method comprising: counter-rotating a pair of sealing dies, wherein each sealing die is supported by a respective one of a pair of shafts extending from a first shaft end portion to a second shaft end portion; heating, by a respective heating drum, each one of said pair of counter-rotating sealing dies; pressing, by the pair of counter-rotating sealing dies, two tissue webs together to produce pockets for containing the substance; and sealing, by the pair of counter-rotating sealing dies, around the outside of said pockets; wherein pressing the tissue webs by the pair of counter-rotating sealing dies comprises: controlling a first pressure device to act on one of the pair of shafts to provide a first control of the pressure exerted by the sealing dies on the tissue webs, and controlling a second pressure device to act on at least one of the pair of shafts to provide a second control of the pressure exerted by the sealing dies on the tissue webs.

An arrangement in accordance with the fourth embodiment may be used in combination with the first embodiment or third embodiment. Similarly, a method in accordance with the fifth embodiment may be used in combination with the second embodiment.

By providing a second pressure device to act on at least one of the pair of shafts in addition to a first pressure device acting one of the pair of shafts, improved control of the distribution of pressure exerted by the sealing dies over their full length can be achieved. This can be beneficial, for example, if the speed of the sealing dies is increased to produce teabags at a greater rate, and/or a bonding agent requires the pressure to be kept within a narrow range. Particularly, the improved apparatus can ensure that the pockets being produced at one end of the sealing dies and at the other end of the sealing dies are sealed at substantially the same pressure as each other.

Each shaft may have a first (inboard) shaft end portion projecting inboard of the respective sealing die, an intermediate shaft portion projecting through the respective sealing die, and a second (outboard) shaft end portion projecting outboard of the respective sealing die.

The first pressure device may be configured to act on one of the first shaft end portions to provide the first control of the pressure exerted by the sealing dies on the tissue webs.

The second pressure device may be configured to act on at least one of the second shaft end portions to provide the second control of the pressure exerted by the sealing dies on the tissue webs.

By providing the first pressure device to act on one of the first (inboard) shaft end portions, and providing the second pressure device to act on at least one of the second (outboard) shaft end portions, the distribution of pressure exerted by the sealing dies over their full length can be controlled from both ends of the packaging apparatus to achieve tighter/improved control. This can be beneficial, for example, if the speed of the sealing dies is increased to produce teabags at a greater rate, and/or a bonding agent requires the pressure to be kept within a narrow range. Particularly, the improved pressure control from both ends of the packaging apparatus can ensure that the pockets being produced at one end of the sealing dies and at the other end of the sealing dies are sealed at substantially the same pressure as each other.

The pair of shafts may extend side-by-side. The second pressure device may be positioned between one of the second shaft end portions and the other one of the second shaft end portions. Alternatively, the second pressure device may be positioned on a side of one of the second shaft portions which is opposite to the side position of the other second shaft portion.

The second pressure device may be configured to apply a force to urge the shafts towards each other.

The second pressure device may be configured to apply a force to urge the second shaft end portions towards each other.

The second pressure device may be configured to apply a force to urge the shafts away from each other.

The second pressure device may be configured to apply a force to urge the second shaft end portions away from each other.

The first pressure device may be configured to apply a force acting on one of the first shaft end portions.

The force of the first pressure device may act to urge the first shaft end portions towards each other.

The packaging apparatus may comprise a load cell for measuring the force applied by first pressure device.

The packaging apparatus may comprise a load cell for measuring the force applied by the second pressure device.

Controlling the second pressure device may comprise measuring, using the load cell, the force applied by the second pressure device.

The second pressure device may be configured such that the force is adjustable.

Controlling the second pressure device may comprise adjusting the force applied by the second pressure device based on the measurements of the load cell.

The second pressure device may comprise at least one pressure cylinder. The at least one pressure cylinder may be utilised to apply the force acting between the second shaft end portions.

The at least one pressure cylinder may be configured to have the pressure therein adjusted.

Adjusting the force applied by the second pressure device may comprise adjusting the pressure of the at least one pressure cylinder.

The at least one pressure cylinder may comprise at least one single action pressure cylinder.

The at least one pressure cylinder may comprise at least one double action pressure cylinder.

Adjusting the force applied by the second pressure device may comprise: adjusting a first force which acts to urge the second shaft end portions towards each other by adjusting the pressure at one end of the at least one pressure cylinder; and adjusting a second force which acts to urge the second shaft end portions away from each other by adjusting the pressure at the other end of the at least one pressure cylinder.

The second pressure device may be configured to provide said second control by being set to a predetermined setting.

The first pressure device may be configured to provide said first control by being set to a predetermined setting.

The at least one predetermined setting at which the second pressure device is set may be the force acting between the second shaft end portions. The force may be exerted for example as a result of the pressure in the at least one pressure cylinder.

The at least one predetermined setting at which the first pressure device is set may be the force acting between the first shaft end portions. The force may for example be exerted by a spring acting to urge one of the first shaft and portions towards the other of the first shaft end portions.

Controlling the second pressure device may comprise setting the second pressure device to a predetermined setting to provide said second control.

Controlling the first pressure device may comprise setting the first pressure device to a predetermined setting to provide said first control.

During operation (e.g. during pocket production), a sensor (e.g. the load cell) may determine that the first pressure device and/or the second pressure device are/is not operating at the respective predetermined setting, or are/is operating outside a permitted tolerance relative to the respective setting. This may happen for example in response to an unexpected variation in the consistency of the substance (such as tea) to be contained in the pockets, causing a change in the pressure exerted by the sealing dies on the tissue webs and a consequent altered reaction force on the first and second pressure devices. Thus the first or second pressure devices may be unable to provide the first and second controls of the pressure exerted by the sealing dies at their respective predetermined settings.

The method may comprise stopping the method responsive to determining that the first pressure device and/or the second pressure device are/is unable to provide said first control or said second control at the respective predetermined setting.

The method may comprise raising an alert responsive to determining that the first pressure device and/or the second pressure device are/is unable to provide said first control or said second control at the respective predetermined setting.

Stopping operation of the packaging apparatus may thus avoid the production of faulty pockets (e.g. teabags).

The at least one predetermined setting may be selected based upon results from integrity testing of the seal of pockets during a set up phase of the packaging apparatus.

In embodiments, the first pressure device may be set at a first pressure device setting (for example the force exerted by a resilient means such as a spring) to provide the first control of the pressure exerted by the sealing dies on the tissue webs when the packaging apparatus is operated to produce pockets containing the substance, and the second pressure device may be set at a second pressure device setting (for example the force exerted by a resilient means such as at least one pneumatic pressure cylinder) to provide the control of the pressure exerted by the sealing dies on the tissue webs when the packaging apparatus is operated to produce pockets containing the substance. Thus, once the first and second pressure devices are set at the desired settings, they may remain at those settings while producing the pockets, without adjustment during a run of pocket production. They then provide the first and second controls of the pressure exerted by the sealing dies based on the first and second pressure device settings.

The predetermined settings may differ from apparatus to apparatus depending on a variety of real-world factors (machining tolerances, etc.). Accordingly, during a setup phase of the packaging apparatus, the packaging apparatus can be run over the complete range of available settings in order to predetermine the optimal settings for the running of the particular packaging apparatus. The set-up phase may include strength/integrity testing of the sealing between the tissue webs produced by the packaging apparatus across the range of available settings.

The packaging apparatus may comprise a pair of second bearings, each second bearing rotatably supporting one of the shafts at the second shaft end portion thereof.

One of the first mentioned bearings rotatably supporting one of the shafts at the first shaft end portion thereof may be fixed relative to a main body of the packaging apparatus.

The other one of the first mentioned bearings rotatably supporting one of the shafts at the first shaft end portion thereof may be movable relative to the main body.

The lower first bearing may be fixed relative to the main body of the packaging apparatus.

The upper first bearing may be movable relative to the main body of the packaging apparatus.

The upper first bearing may be movable vertically relative to the first lower bearing.

One of the second bearings rotatably supporting said one of the shafts at the second shaft end portion thereof may be fixed relative to the main body.

The other one of the second bearings rotatably supporting one of the shafts at the second shaft end portion thereof may be movable relative to the main body.

The lower second bearing assembly may be fixed relative to the main body of the packaging apparatus.

The lower second bearing assembly may be fixed relative to the main body of the packaging apparatus by a support strut.

The main body of the apparatus may comprise a base of the apparatus.

The main body of the apparatus may comprise a machine main drive of the apparatus.

The support strut may extend from the base of the packaging apparatus to the second lower bearing assembly.

The upper second bearing assembly may be movable relative to the main body of the packaging apparatus.

The second pressure device may be configured to apply a force acting between one of the second bearings and the other one of the second bearings.

Certain embodiments of the technology will now be described, by way of example only, with reference to the accompanying drawings in which.

Figure 1:
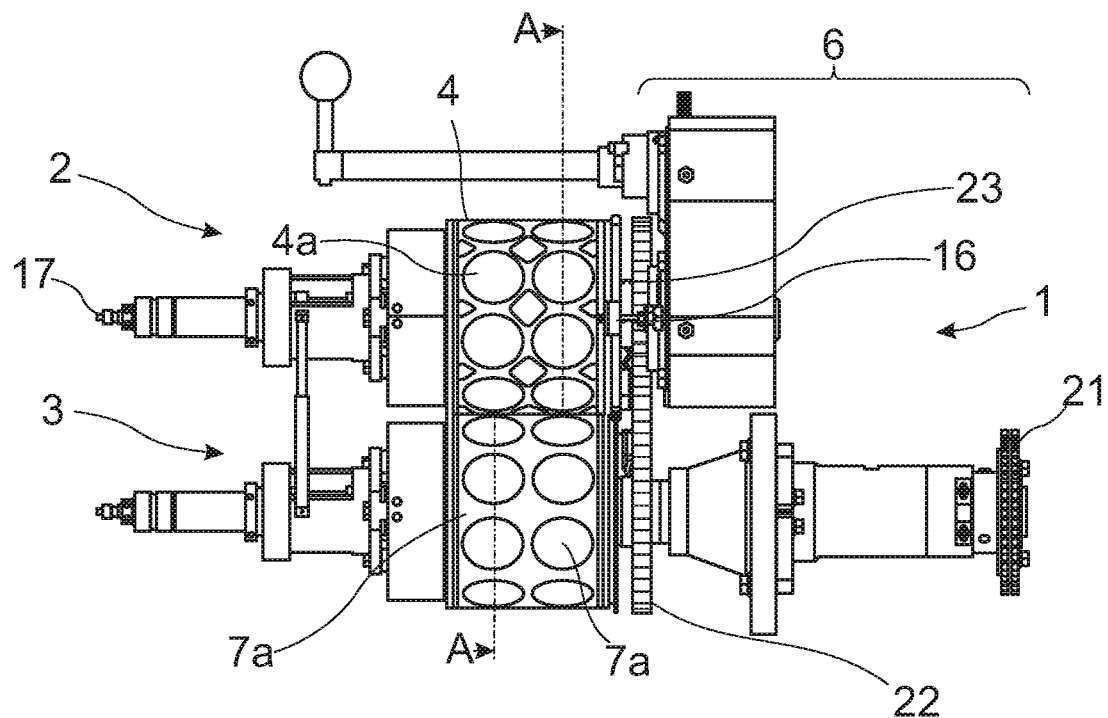
FIG. 1 is a schematic view showing an embodiment of the apparatus.
Figure 2:
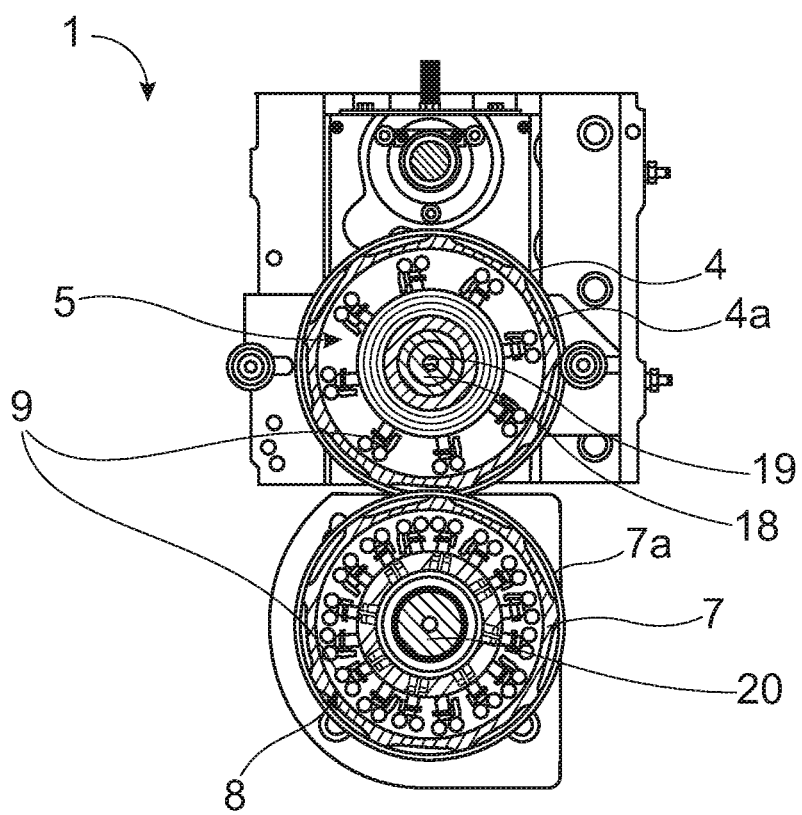
FIG. 2 is a schematic cross-sectional view along the lines A-A of FIG. 1.

Apparatus 1 for manufacturing pockets from two tissue webs is illustrated in FIGS. 1 and 2. The apparatus is capable of pressing together the two webs to produce the pockets for containing a substance for preparing beverages, particularly tea leaves, i.e. the pockets are tea bags in this embodiment. During operation of the apparatus the substance is introduced between the webs into the pockets to produce bags containing the substance, such as tea bags.

The apparatus 1 comprises an upper sealing assembly 2 and a lower sealing assembly 3. The upper sealing assembly 2 includes an upper sealing die 4 and an upper heating drum 5, arranged to be coaxially aligned around an upper shaft 18. The upper sealing assembly 2 has an "inboard" end at the right of FIG. 1 and an "outboard" end at the left of FIG. 1.

Similarly, the lower sealing assembly 3 includes a lower sealing die 7 and a lower heating drum 8 arranged to be coaxially aligned around a lower shaft 20. The lower sealing assembly 3 has an "inboard" end at the right of FIG. 1 and an "outboard" end at the left of FIG. 1.

A sealing die drive system 6 is configured to support the upper and lower sealing assemblies 2, 3 and drive the upper and lower sealing dies 4, 7 in a counter-rotating manner.

The respective shafts 18, 20 of the upper sealing assembly 2 and lower sealing assembly 3 are supported at the inboard end in bearings 28, 29 of the sealing die drive system 6. The respective shafts 18, 20 of the upper sealing assembly 2 and lower sealing assembly 3 are supported, at the outboard end, in bearings 31, 32. A sprocket 21 is mounted on the lower shaft 20 and is engaged by a chain (not shown) which itself is arranged to be driven by a machine main drive (not shown) which also drives other sealing assemblies. A lower gear 22 adjacent to the lower sealing die 7 is arranged on the lower shaft 20 and engages with an upper gear 23 adjacent to the upper sealing die 4 arranged on the upper shaft 18. When the lower shaft 20 is driven, the lower sealing die 7 rotates with the shaft, and engagement of the lower gear 22 with the upper gear 23 causes the upper shaft 18 to be driven at the same speed in counter-rotating manner.

The upper shaft 18 is connected to the sealing die drive system 6 such that the sealing die drive system 6 can be operated to move the upper sealing assembly 2 relative to the lower sealing assembly 3, in a plane perpendicular to the axis of rotation of the upper shaft 18. Separation of the upper sealing die 4 from the lower sealing die 7 enables two tissue webs to be threaded in a gap between the sealing dies prior to operation. Before starting normal operation, the sealing die drive system 6 is operated to lower the upper sealing assembly 2 and engage the upper and lower gears 23, 22 of the upper and lower sealing assemblies 2, 3, thus enabling the transfer of rotary motion from the lower shaft 20 to the upper shaft 18 and the upper sealing die 4.

The upper and lower sealing dies 4, 7 are configured to be brought into contact in a sealing zone to provide pressure and heat sealing to the two tissue webs. The upper and lower sealing dies 4, 7 are shaped in such a way that, during the sealing process, the tissue webs are sealed to each other around the outside of a pocket for containing tea. As can be seen in FIG. 1, the upper and lower sealing dies 4, 7 include concave recesses 4a, 7a for the purpose of forming pockets for containing the tea, i.e. tea bags.

The upper heating drum 5 is configured to heat the upper sealing die 4 to a desired sealing temperature as the upper sealing die 4 rotates around the upper heating drum 5. The lower heating drum 8 is configured to heat the lower sealing die 7 to the desired sealing temperature as the lower sealing die 7 rotates around the lower heating drum 8. As can be seen in FIG. 2, the upper and lower heating drums 5, 8 comprise an arrangement of circumferentially distributed infrared heating elements 9. The infrared heating elements 9 of the upper and lower heating drums 5, 8 are positioned to be proximate to the upper and lower sealing dies 4, 7 for effective heat transfer.

Figure 3:
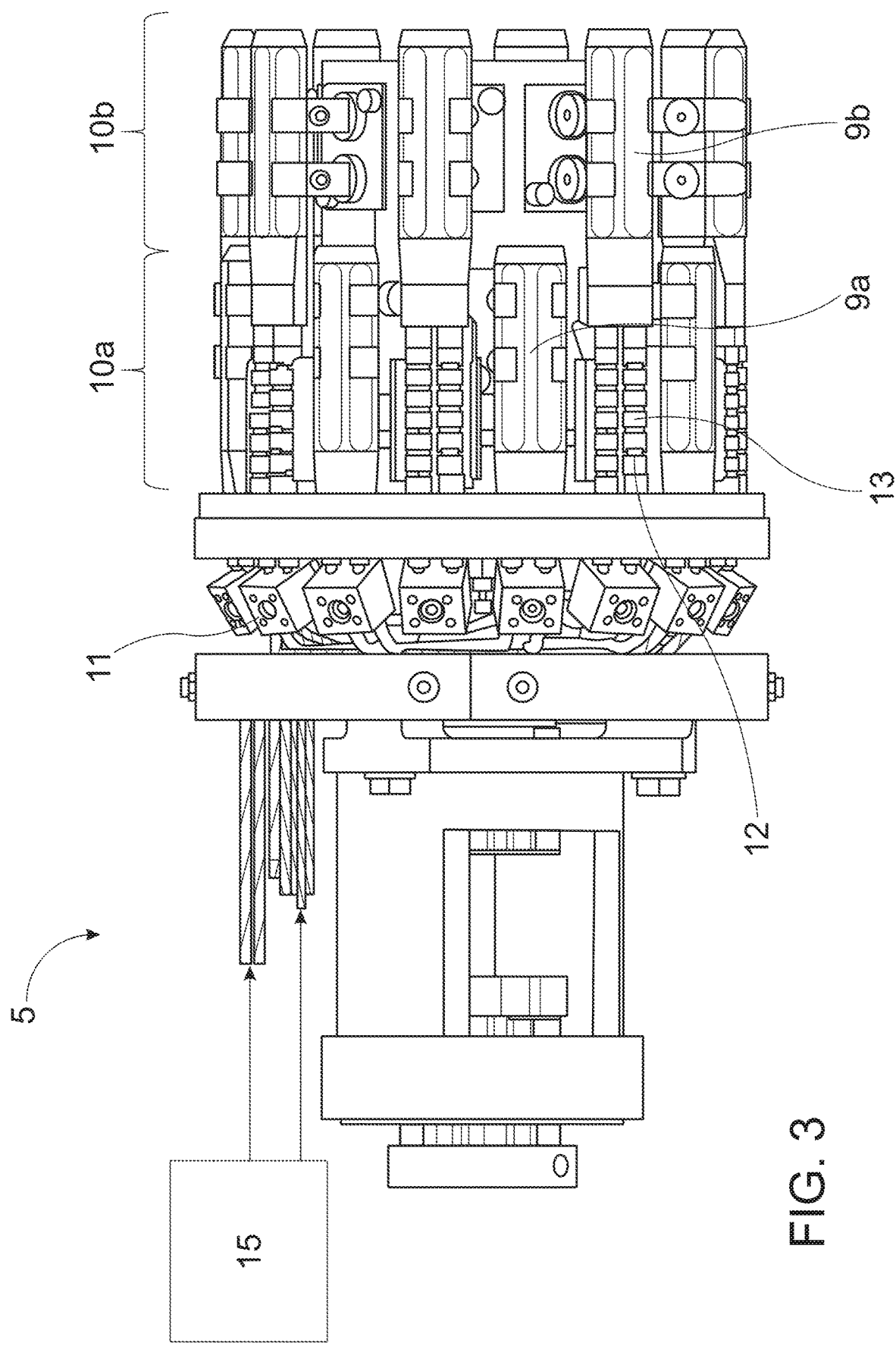
FIG. 3 is a schematic view showing an embodiment of a heating drum of the apparatus.
Figure 4:
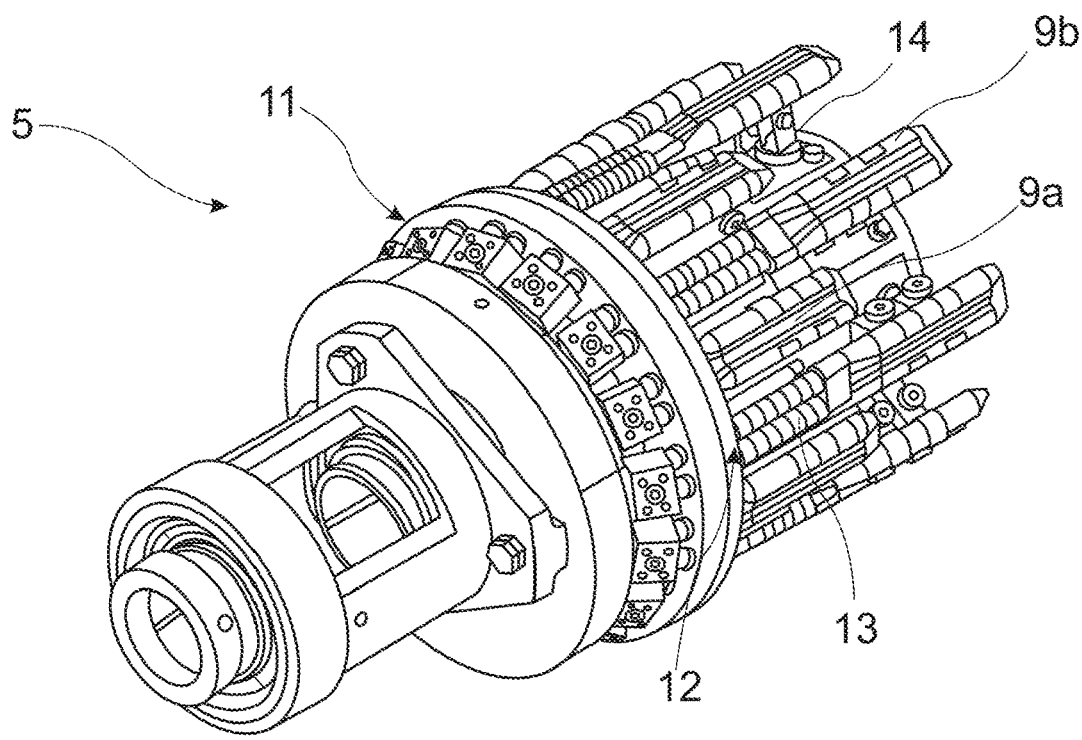
FIG. 4 is another schematic view of the heating drum of FIG. 3.

FIGS. 3 and 4 show an exemplary arrangement of infrared heating elements 9a, 9b in the upper heating drum 5 in accordance with an embodiment. Such an arrangement may be implemented in an upper heating drum 5 and/or a lower heating drum 8 of the apparatus 1.

The heating drum 5 comprises a first heating zone 10a comprising a first plurality of circumferentially distributed infrared heating elements 9a proximate to the outboard end of the upper sealing assembly 2. Heating drum 5 also comprises a second heating zone 10b comprising a second plurality of circumferentially distributed infrared heating elements 9b proximate to the inboard end of the upper sealing assembly 2.

The first heating zone 10a may therefore also be referred to as the outboard heating zone, and the second heating zone 10b may be referred to as the inboard heating zone.

Each one of the circumferentially distributed infrared heating elements 9a, 9b is electrically connected to a power source via one of a plurality of connector blocks 11 at the outboard end of the sealing assembly 2.

In the present example each heating zone 10a, 10b comprises eight infrared heating elements 9a, 9b spaced apart from each other at regular intervals around the circumference of the heating drum 5. The infrared heating elements 9a, 9b comprise short wave (a wavelength between 0.7 µm-3.0 µm, more particularly between 0.8 µm-1.6 µm) carbon infrared elements in a quartz glass tube. The heating elements are made of carbon fibre.

The first infrared heating elements 9a are circumferentially offset from the second infrared heating elements 9b. Electrical wiring 12 extends from a respective connector block 11 to each one of the second infrared heating elements 9b. The electrical wiring 12 is disposed in the spaces between the circumferentially distributed first infrared heating elements 9a.

The electrical wiring 12 is protected from the high temperatures of the first (outboard) heating zone by ceramic beads 13. The first and second infrared heating elements 9a, 9b, and electrical wiring 12, is held in place by a support structure 14.

Figure 5:
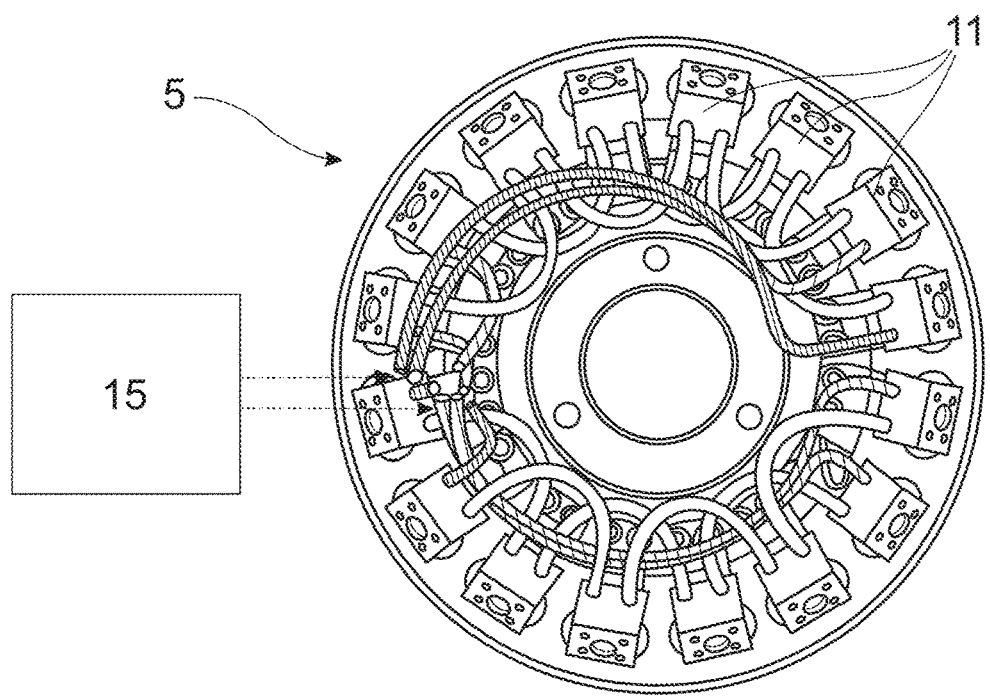
FIG. 5 is a schematic end view of the heating drum of FIGS. 3 and 4.

The connector blocks 11, positioned at the outboard end of the heating drum 5, electrically connect the plurality of first infrared heating elements 9a to each other and to a temperature control system 15, as shown in FIG. 5. Similarly, the connector blocks 11 electrically connect the plurality of second infrared heating elements 9b to each other and to the temperature control system 15.

The connector blocks 11 electrically connect four of the first infrared heating elements 9a in series, and another four of the first infrared heating elements 9a in series. The connector blocks 11 electrically connect four of the second infrared heating elements 9b in series, and another four of the second infrared heating elements 9b in series.

In this way, if one of the first or second infrared heating elements 9a, 9b fails, then the power output of either the first or second heating zone is halved. This is a large change that is easily detectable such that the operating process can be shut down. Therefore the arrangement provides a robust fault detection system.

With reference to FIG. 1, the temperature control system 15 comprises a temperature sensor 16 (e.g. a thermocouple) embedded in the inboard end of the upper sealing die 4. Although not shown in FIG. 1, in the described embodiment there is a temperature sensor 16 positioned at the inboard end of both the upper and lower sealing dies 4, 7.

The temperature sensor 16 is connected to the temperature control system 15 via an electrical cable 19 (see FIG. 2) running through an axial cavity in the centre of the upper shaft 18. At the outboard end of the shaft, the cable is connected to a rotary electrical connector 17 (for example, a mercury or brush rotary electrical connector) which is in electrical communication with the temperature control system 15.

A method for packaging a substance for preparing beverages, in particular a method for packaging of tea into tea bags, is now described.

During operation of the apparatus 1, the upper sealing die 4 and the lower sealing die 7 are pressed together and driven by the sealing die drive system 6 in a counter-rotating manner. Two tissue webs, which are fed into the apparatus 1 by an external feeder mechanism, are pressed together by the upper and lower sealing dies 4, 7.

The sealing dies 4, 7 press together the parts of the tissue webs around the edges of the concave recesses 4a, 7a to produce pockets for containing tea leaves. The tea leaves are inserted into the pockets during the two tissue webs being fed into the apparatus 1, so as to form tea bags.

The upper and lower sealing dies 4, 7 are heated by the upper and lower heating drums 5, 8 in order to maintain a desired sealing temperature. The sealing temperature is predetermined and based on the particular bonding agent being used in the tissue webs. For example, the sealing temperature may be higher than 130° C., the melting point of bonding agent polylactic acid (PLA), or higher than 160-170° C., the melting point of bonding agent polypropylene. Therefore, where the heated upper and lower sealing dies 4, 7 press together the tissue webs, the bonding agent present in the tissue webs is melted and the tissue webs are sealed together.

The temperatures of the upper and lower sealing dies 4, 7 are separately controlled.

Each heating drum 5, 8 is controlled during operation to manage the transfer of heat to each sealing die 4, 7. This control maintains an accurate temperature of each sealing assembly, i.e. within a close tolerance, e.g. of +/−3° C. The control maintains a uniform temperature as between the inboard and outboard ends of the sealing assemblies. This can ensure that the pockets being produced at the inboard end of the sealing assemblies and at the outboard end of the sealing assemblies are sealed at substantially the same temperature as each other. The sealing die drive system 6 at the inboard end of the sealing assemblies tends to act as a heat sink, resulting in heat being lost from the inboard end of the heating assemblies to a greater extent than at the outboard end. By the management of the transfer of heat into the upper sealing die 4 by independently controlling the heat output from the heating elements 9a in the first heating zone 10a (the outboard heating zone) and the heat output from the heating elements 9b in the second heating zone 10b (the inboard heating zone), more heat can be output by the heating elements 9b in the second (inboard) heating zone 10b. A similar management can be performed for the lower sealing die 7. As a result, a uniform temperature as between inboard and outboard ends of the sealing assemblies can be achieved, despite the heat sink effect of the sealing die drive system 6. This control of the transfer of heat in and out of the sealing dies 4, 7 is controlled by the temperature control system 15.

The temperature control system 15 can use a variety of measurements and prediction software to determine how the sealing assemblies 2, 3 should be controlled.

In one instance, during a set-up phase of the apparatus 1, the apparatus 1 may be initialised so that the upper and lower sealing dies 4, 7 are rotated for a short period, for example 2-3 minutes, whilst being heated by the heating drums 5, 8 which are set with their outboard and inboard heating zones (first heating zone 10a and second heating zone 10b in the case of the upper heating drum 5) to provide the same heat output as each other. The purpose of this rotation phase is to allow the upper and lower sealing dies to reach an equilibrium temperature. The rotation of the sealing dies 4, 7 is then stopped such that the temperature distribution across the dies 4, 7 may be measured. By measuring temperature when the rotation has stopped, a more accurate result is obtained compared to attempting to measure temperature whilst the dies are still rotating.

The temperature measurement is performed manually using a temperature touch probe or the like. The temperature probe may be used to measure the temperature at one or more locations along the surface of the sealing dies 4, 7. If the set up phase involves more than one set-up step, for example set-up steps at a selection of identical heat outputs for the outboard and inboard heating zones, or at a selection of different heat outputs for the outboard and inboard heating zones, it is ensured that the or each location at which the temperature is measured is the same for each measurement. This avoids variations caused by differing surface roughness or emissivity at different points on the sealing dies.

In a set-up step in which the heat outputs for the outboard and inboard heating zones are the same as each other, in the event that the temperature distribution is determined to vary (linearly, or otherwise) along the length of the sealing dies 4, 7, the temperature control system is able to independently control the first and second plurality of circumferentially distributed infrared heating elements (9a, 9b in the case of the upper heating drum) to modify the relative heat output of the outboard (first) and inboard (second) heating zones (10a, 10b in the case of the upper heating drum 5). In this embodiment, the temperature distribution in the set-up step is a variation with a lower temperature at the inboard end of the sealing dies 4, 7, which are nearest the sealing die drive system 6, compared to the temperature at the outboard end of the sealing dies 4, 7.

Further set-up steps may then be carried out, each time with adjusted heat outputs of the outboard and inboard heating zones, with a view to compensating for temperature variation along the length of the sealing dies 4, 7 so as to achieve a substantially uniform temperature along the length of the dies.

Based on the results of one or more set-up steps, the control system 15 is configured so that during normal operation in the production of pockets containing the substance, the heat output by the outboard and inboard heating zones for the upper and lower sealing dies 4, 7 is such as to achieve a substantially uniform temperature along the length of the dies. In this embodiment, more heat is output by the inboard heating zone than is output by the outboard heating zone to achieve this result. In this embodiment, two parallel lines of pockets are produced, one being nearer to the inboard end of the sealing assemblies 2, 3, and the other being nearer to the outboard end of the sealing assemblies. By providing a substantially uniform temperature along the length of the dies, differences between the temperatures at which the pockets for the two lines are sealed can be generally avoided.

In this embodiment, temperature measurements are taking during normal operation in the production of pockets containing the substance. For this purpose, temperature measurements can be continuously provided by the temperature sensor 16 located at the inboard end of the upper sealing die 4, and by a corresponding temperature sensor located at the inboard end of the lower sealing die 7. The temperature control system 15 may utilise the temperature measurements from the temperature sensors 16 in order to determine the temperature of the inboard ends of the sealing dies 4, 7 during normal operation of the apparatus 1. The temperature control system 15 may then control both the first and the second pluralities of circumferentially distributed infrared heating elements 9a, 9b in accordance with the measured operational temperature of the inboard ends of the sealing dies 4, 7.

In this embodiment, temperature measurements are taken only at the inboard ends of the sealing dies 4, 7. However, during the set-up step(s) it is established that for given temperatures at the inboard ends, there will be certain known temperatures at the outboard ends. Therefore temperature measurements provided during operation by the temperature sensors 16 are sufficient for the temperature control system 15 to apply an appropriate heating offset between the required heat outputs of the outboard (first) and inboard (second) heating zones 10a, 10b. The temperature control system 15 calculates the heating offset. The heating offset is implemented during independent control of the first and second plurality of circumferentially distributed infrared heating elements 9a, 9b in the case of the upper heating drum 5, and similarly in the case of the first and second plurality of circumferentially distributed infrared heating elements in the case of the lower heating drum 8.

When a desired temperature for the sealing dies 4, 7 is required, for example to achieve optimum sealing for a given sealant present in the tissue webs, this may be manually entered into the temperature control system 15, which then controls the heating outputs of the outboard (first) and inboard (second) heating zones to achieve that desired temperature for the sealing dies uniformly along the length thereof. The temperature can be continuously monitored by the temperature sensors 16 outputting the sensed temperatures of each of the sealing dies to the temperature control system 15, which then makes any necessary adjustments to control the temperature of the dies.

Figure 6:
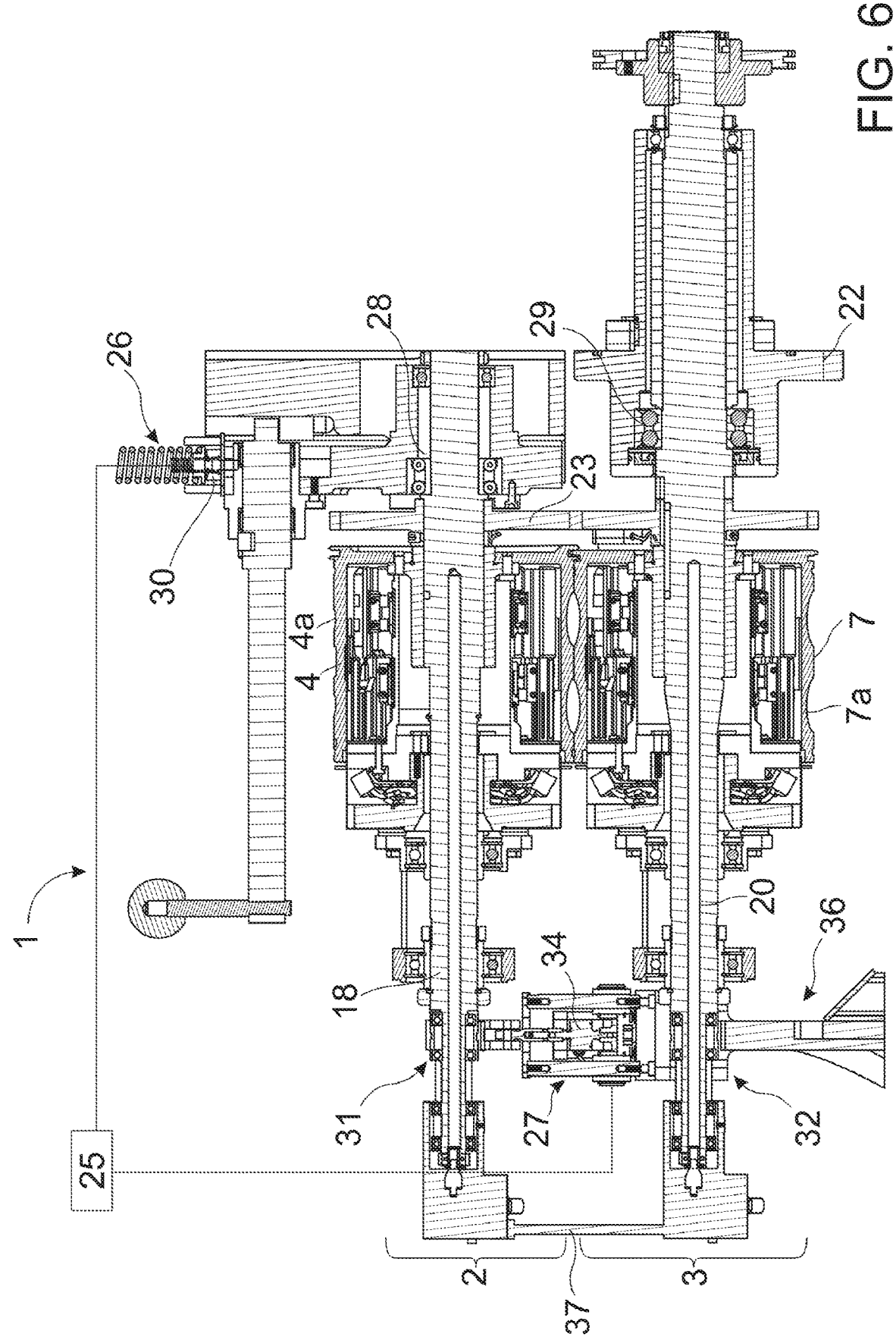
FIG. 6 is a schematic cross-sectional view showing an embodiment of the apparatus.

In FIG. 6, the packaging apparatus 1 is shown further comprising a pressure control system 25. The pressure control system 25 of the packaging apparatus 1 comprises, and is configured to control, a first pressure device 26 and a second pressure device 27.

The pressure control system 25 is configured to provide control of the pressure exerted by the sealing dies 4, 7 to the two tissue webs over the full length of the sealing dies 4, 7. In conventional machines, some control over the pressure applied between sealing dies is provided by a single pressure device. However, the inventors have identified that precision control of the pressure distribution can be further improved by providing a second pressure device configured to operate in a complementary manner to a first pressure device.

As discussed above, during operation of the packaging apparatus 1 the upper and lower sealing dies 4, 7 are configured to be brought into contact in the sealing zone to press together the two tissue webs as the tissue webs are fed through the apparatus 1. The upper and lower sealing dies 4, 7 are driven by the sealing die drive system 6 in a counter-rotating manner and are heated by the respective heating drum 5, 8. Each of the upper and lower sealing dies 4, 7 is supported on the respective rotating shaft 18, 20.

Each shaft 18, 20 has a first (inboard) shaft end portion projecting inboard of the respective sealing die 4, 7, an intermediate shaft portion projecting through the respective sealing die 4, 7, and a second (outboard) shaft end portion projecting outboard of the respective sealing die 4, 7. The shafts 18, 20 are rotatably supported at the first (inboard) shaft end portion in respective upper and lower first bearing assemblies 28, 29 of the sealing die drive system 6.

In order to provide a first control of the pressure distribution in the sealing zone, a first pressure device 26 is configured to act on at least one of the first (inboard) shaft end portions.

As shown in FIG. 6, the first pressure device 26 is located at an inboard side of the packaging apparatus 1 and is configured to apply a downward force on the first (inboard) shaft end portion of the upper shaft 18 at the upper first bearing assembly 28.

In other words, the force applied by the first pressure device 26 acts in a direction to urge the first (inboard) shaft end portions of the respective shafts 18, 20 together. Particularly, the force applied by the first pressure device 26 acts in a direction to push the upper first bearing assembly 28 towards the lower first bearing assembly 29. The lower first bearing assembly 29 is fixed relative to the main machine body (e.g. a base and/or other structures of the packaging apparatus), whereas the upper first bearing assembly 28 (and the upper shaft 18) is movable relative to the main machine body.

Thus, the deflection of the upper and lower shafts 18, 20 can be influenced by adjusting the magnitude of the force applied to the first (inboard) shaft end portion of at least one of the shafts 18, 20. This first control over the pressure distribution in the sealing zone between the sealing dies 4, 7 is thus provided by adjusting the forces at the first (inboard) shaft end portions and influencing the relative deflections of the shafts 18, 20.

In the embodiment shown in FIG. 6, the first pressure device 26 comprises a nut, a bolt and a spring, and is positioned directly above the upper bearing assembly 28. As discussed above, the upper sealing assembly 2 is connected to the sealing die drive system 6 via the upper bearing assembly 28 such that the packaging apparatus 1 can be operated to move the upper sealing assembly 2 relative to the lower sealing assembly 3 (and the main body of the apparatus 1), in a plane perpendicular to the axis of rotation of the upper shaft 18. In FIG. 2, for example, the upper bearing assembly 28 is configured to be slidably movable in a vertical direction, relative to the rest of the sealing die drive system 6. Accordingly, the nut can be adjusted on the bolt to adjust the pressure applied by the spring to the upper bearing assembly 28 and consequently adjust the pressure applied by the upper sealing assembly 2 (to the tissue webs and/or the lower sealing assembly 3) in the sealing zone.

In one embodiment, the first pressure device 26 is automatically monitored and controlled by the pressure control system 25. The first pressure device 26 includes a load cell 30 configured to measure the force applied to the first (inboard) shaft end portion of the respective shaft 18, 20. The pressure control system 25 is configured to, in accordance with the force measured by the load cell 30, adjust the first pressure device 26 (for example, by an actuator attached to the nut, or otherwise) to regulate the force. Additionally, or alternatively, where the first pressure device 26 comprises a nut, a bolt and a spring, the nut can be adjusted manually as required, e.g. by an operator of the apparatus 1.

To provide a second control of the pressure exerted by the sealing dies 4, 7 on the tissue webs, there is provided a second pressure device 27 configured to act on at least one of the second (outboard) shaft end portions.

In the embodiment shown in FIG. 6, the second pressure device 27 is located at an outboard side of the packaging apparatus 1 and is configured to apply a force acting between one of the second (outboard) shaft end portions and the other one of the second (outboard) shaft end portions. The force applied by the second pressure device 27 between the upper shaft 18 and the lower shaft 20 acts to urge the second (outboard) shaft end portion of the upper shaft 18 towards the second (outboard) shaft end portion of the lower shaft 20.

Accordingly, the relative deflections of the upper and lower shafts 18, 20 can be regulated by adjusting the force applied to the second (outboard) shaft end portions of each shaft 18, 20. Being able to control the deflection of the upper shaft 18 relative to the lower shaft 20 at the outboard end of the packaging apparatus 1 provides improved precision control over the pressure distribution in the sealing zone between the sealing dies 4, 7.

Figure 7:
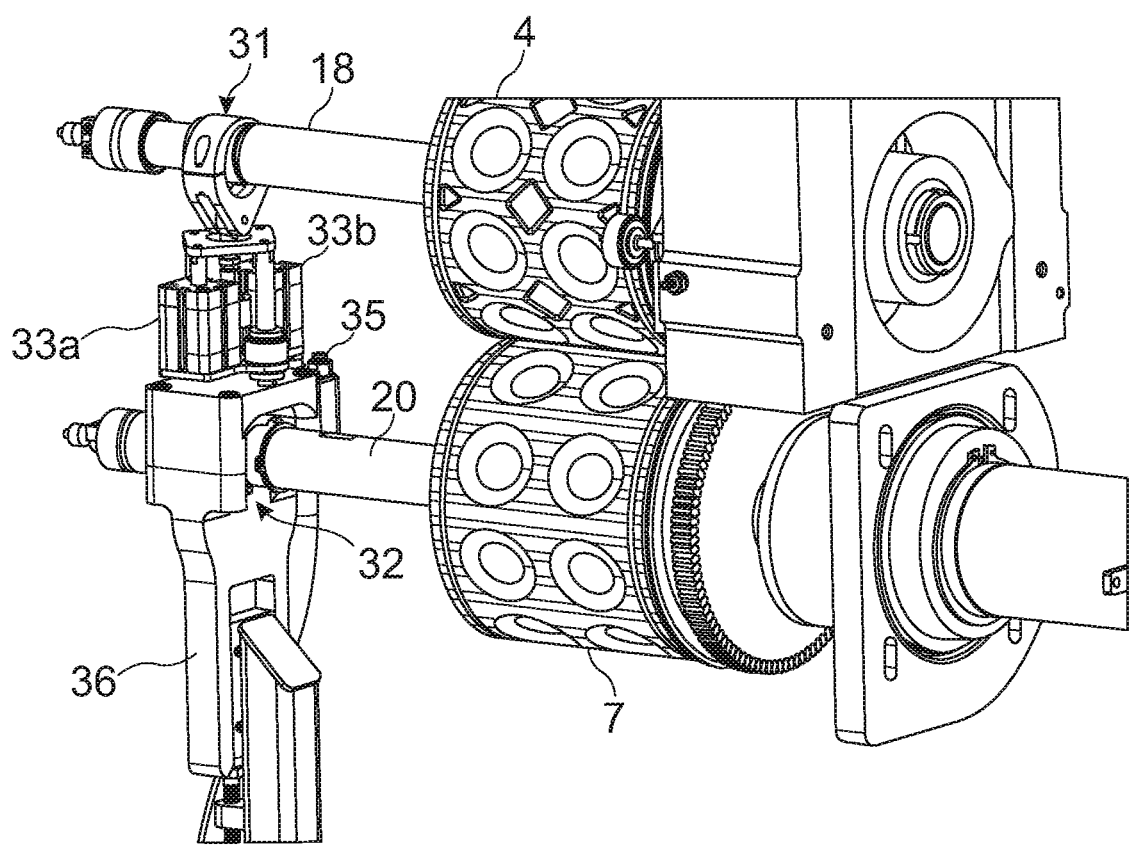
FIG. 7 is a schematic view showing an embodiment of a second pressure device in the apparatus.
Figure 8:
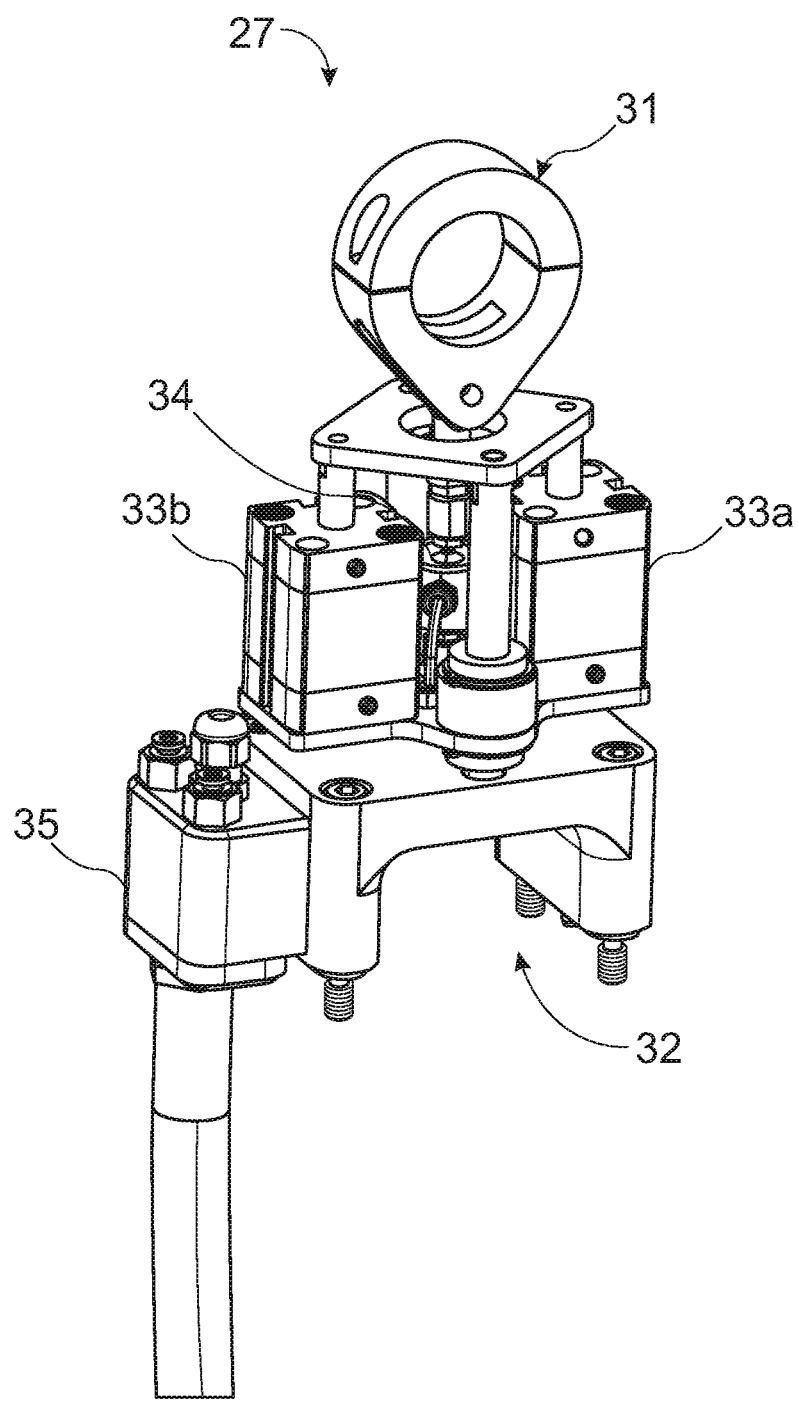
FIG. 8 is another schematic view of the second pressure device of FIG. 7.

In the embodiment shown in FIGS. 6, 7 and 8, the second pressure device 27 comprises an upper second bearing assembly 31 and a lower second bearing assembly 32. The upper second bearing assembly 31 and the lower second bearing assembly 32 are configured to receive, and rotatably support, the upper shaft 18 and the lower shaft respectively.

During operation, the second pressure device 27 is configured to urge the upper second bearing assembly 31 towards or away from the lower second bearing assembly 32 in order to control the bending moments exerted upon each shaft 18, 20. To this end, the second pressure device 27 comprises at least one pressure cylinder 33 (e.g. pressure cylinders 33a, 33b) which operatively connects the upper second bearing assembly 31 to the lower second bearing assembly 32.

In the specific embodiment shown in FIG. 8, the pressure cylinders 33a, 33b are single action pressure cylinders and a barrel of each of the pressure cylinders 33a, 33b is fixed to a sliding plate of the second pressure device 27. The sliding plate is slidably mounted on support columns of the second pressure device 27. The upper second bearing assembly 31 is coupled to said sliding plate, a piston of each of the one or more pressure cylinders 33a, 33b is fixed to the top ends of the support columns by a plate, and the bottom ends of the support columns are fixed to the lower second bearing assembly 32. Thus, as pressure inside the cylinders 33a, 33b increases, the downward pressure on the sliding plate increases, which in turn applies a downward pulling force on the upper shaft 18 via the upper second bearing assembly 31.

Alternatively, the pressure cylinders 33a, 33b are double action pressure cylinders, having a port at both ends of the barrel. As such, the pressure on either side of the piston can be independently adjusted, and one pressure cylinder 33 is able to provide both push and pull forces as required by the packaging apparatus 1.

As can be seen in FIG. 6, the second pressure device 27 comprises a load cell 34 which is configured to measure the force applied by the second pressure device 27. The load cell 34 is connected between the sliding plate and the upper second bearing assembly 31.

The pressure control system 25 is configured to, in accordance with the force measured by the load cell 34, adjust the pressure within the pressure cylinders 33a, 33b to regulate the force applied to each shaft 18, 20. For example, as shown in the described embodiment of FIG. 8, the pressure control system 25 is configured to control one or more valves 35, which connect the barrels of the pressure cylinders 33a, 33b to a source of pressurised air, in order to change the pressure within the one or more pressure cylinders 33a, 33b and thus adjust the force applied to the second (outboard) end shaft portion of each shaft 18, 20.

In an embodiment where the one or more pressure cylinders 33a, 33b are double action pressure cylinders, by increasing the pressure in one side or the other of the one or more pressure cylinders 33a, 33b, the second (outboard) shaft end portions of the shafts 18, 20 can be urged towards or away from each other to control the pressure distribution in the sealing zone of the sealing dies 4, 7.

As shown in FIGS. 6 and 7, the second pressure device 27 further comprises a support strut 36 upon which the lower second bearing assembly 32 is mounted. The support strut 36 extends from the base of the apparatus 1 (upon which the main body of the packaging apparatus 1 is mounted) to the second (outboard) shaft end portion of the lower shaft 20. The support strut 36 is configured to support the lower second bearing assembly 32. As will be apparent, the lower shaft 20 is not a cantilevered shaft, as it is supported at both the first (inboard) shaft end portion and the second (outboard) shaft end portion. Thus, compared to cantilevered arrangements, deflection of the axis of the lower shaft 20 from the horizontal is minimised, particularly at the second (outboard) shaft end portion.

The cantilever arrangement of conventional packaging machines is considered to be beneficial in that the upper sealing die 4 is able to 'float' above the lower sealing die 7, providing a flexible and responsive sealing arrangement in the event of variations in parameters such as tissue web thickness and the volume of substance delivered in the pocket (e.g. tea). In other words, the upper sealing die 4 is able to deviate minor distances from the axis of the upper shaft 18 in response to an increased pressure in the sealing zone, e.g. as a result of an increase in tissue web thickness, or an increase in substance to be sealed in a pocket, away from the target/standard amounts.

However, as a result of this cantilevered arrangement, the rotating shafts are subject to the bending moments and deflections associated with loaded cantilevers. These deflections, which can be further aggravated by machining tolerances during assembly of the packaging apparatus, can negatively impact the sealing performance of the apparatus in the sealing zone of the sealing dies where uniform distribution of pressure is desired. For example, if a cantilevered lower shaft bends away from an upper shaft more at a free end (outboard end) than at a supported end (inboard end), the bonding agent in the tissue webs may not be pressed together sufficiently tightly at the outboard side of the sealing zone and only a weak bond is formed in this area.

Conversely, in the packaging apparatus 1, the upper sealing assembly 2 is able to 'float' above the lower sealing assembly 3 even when the lower shaft 20 is supported by bearings at both the first (inboard) shaft end portion and second (outboard) shaft end portion (i.e. the lower shaft 20 is not cantilevered). The action of the first pressure device 26 urges the first (inboard) shaft end portion of the upper shaft 18, at the upper first bearing assembly 28, towards the first (inboard) shaft end portion of the lower shaft 20, at the lower first bearing assembly 29. The action of the second pressure device 27 urges second (outboard) shaft end portion of the upper shaft 18, at the upper second bearing assembly 31, towards the second (outboard) shaft end portion of the lower shaft 20, at the lower second bearing assembly 32.

As the lower second bearing assembly 32 is fixed relative to the base of the apparatus 1 via the support strut 36, the action of the pressure cylinders 33a, 33b has no effect on the deflection of the lower shaft 20. Instead, the support strut 36 is configured to fix the vertical position of the lower second bearing assembly 32 to minimise the misalignment of the lower shaft 20. By adjusting the pressure in the pressure cylinders 33a, 33b, which each have either the barrel or the piston fixed to the lower second bearing assembly 32, the pressure applied by the upper sealing die 4 to the lower sealing die 7 (i.e. to the tissue between the upper sealing die 4 and the lower sealing die 7) can be controlled in the sealing zone from the outboard end.

As seen on the left of FIG. 6, there is provided a link bar 37 at the outboard end configured to couple the end caps of the shafts 18, 20. The end caps of the shafts 18, 20 protect the rotary electrical connectors 17 (comprising, for example, a mercury or brush rotary electrical connector, as discussed above). The link bar 37 prevents the end caps from rotating as a result of transfer of rotary motion from the shafts 18, 20 through the outermost bearings or components of the rotary electrical connector 17. However, the link bar 37 is telescopic (i.e. is comprised of two sleeved halves) and does not restrict relative movement of the shafts 18, 20 towards or away from each other.

Accordingly, the pressure control system 25 is configured to operate the first pressure device 26 to provide a first pressure control at a first (inboard) shaft end portion and is configured to operate the second pressure device 27 to provide a second pressure control at a second (outboard) shaft end portion. As a result of the first control and second control, the pressure distribution across the full length of the sealing dies 4, 7 can be optimised—pressure variation between the inboard and outboard ends of the sealing assemblies 2, 3 is mitigated to achieve a more uniform pressure, and the production of faulty teabags can be minimised.

The pressure control system 25 can use a variety of measurements to determine how the first and second pressure devices 26, 27 should be set up and regulated.

In one instance, during a set-up phase of the packaging apparatus 1, the apparatus 1 is initialised so that during operation the first pressure device 26 acts to provide said first control by being set to a first predetermined setting and the second pressure device 27 acts to provide said second control by being set to a second predetermined setting.

After a period of operation, the performance of the packaging apparatus 1 is reviewed and the values of the first predetermined setting and the second predetermined setting are revised for the next cycle of operation of the apparatus 1.

Alternatively, the values of the first predetermined setting and the second predetermined setting can be actively updated, i.e. without stopping operation of the packaging apparatus 1.

In the described embodiment, the first predetermined setting sets the force that should be applied by the first pressure device and the second predetermined setting sets the force that should be applied by the second pressure device.

In a set-up of the packaging apparatus 1, the apparatus 1 is operated whilst varying the force applied by the first pressure device and varying the force applied by the second pressure device. The seals of the pockets produced by the packaging apparatus 1 during this set-up operation can then be strength tested to identify the first predetermined setting and the second predetermined setting.

During normal operation of the packaging apparatus 1, the force applied by the first pressure device 26 and the second force applied by the second pressure device 27 is continuously monitored by the load cells 30, 34 and regulated by the pressure control system 25. In other words, the pressure control system 25 is configured to maintain the first force and the second force within a permitted tolerance relative to the value set by the first predetermined setting and the second predetermined setting, respectively.

In the described embodiment, if the sensor determines that the forces applied by the first and second pressure devices 26, 27 are outside of the permitted tolerance relative to the respective setting (as a result of a fault, or otherwise), then the apparatus 1 is configured to cease operation and raise an alarm. This has the advantage of avoiding the production of faulty products, e.g. teabags. However, provided the first pressure device 26 and the second pressure device 27 operate within the permitted tolerances of the first predetermined setting and second predetermined setting respectively, the apparatus 1 is able to achieve improved control of the pressure distribution between the sealing dies 4, 7.

The embodiments described herein are exemplary and modifications may be made in accordance with the disclosure of the specification.

The invention claimed is:

1. Packaging apparatus comprising two counter-rotatable sealing dies for pressing together two tissue webs to produce pockets for containing a substance for preparing beverages and to seal around said pockets, and two heating drums for heating the sealing dies and each being positioned inside a respective sealing die, wherein a first heating zone of each heating drum comprises a first plurality of circumferentially distributed infrared heating elements, and a second heating zone of each heating drum comprises a second plurality of circumferentially distributed infrared heating elements.

2. Packaging apparatus as claimed in claim 1, wherein the infrared heating elements in the second plurality of circumferentially distributed infrared heating elements are axially offset from the infrared heating elements in the first plurality of circumferentially distributed infrared heating elements.

3. Packaging apparatus as claimed in claim 1, wherein the infrared heating elements in the second plurality of circumferentially distributed infrared heating elements are circumferentially offset from the infrared heating elements in the first plurality of circumferentially distributed infrared heating elements.

4. Packaging apparatus as claimed in claim 1, further comprising a temperature control system, wherein the temperature control system is configured to independently control the first and second plurality of circumferentially distributed infrared heating elements.

5. Packaging apparatus as claimed in claim 4, wherein the temperature control system is configured to control the first and second plurality of circumferentially distributed infrared heating elements such that a heat output from one of said pluralities is greater than a heat output from the other of said pluralities.

6. Packaging apparatus as claimed in claim 4, comprising a temperature sensor arranged to measure the temperature at a location on at least one of the sealing dies heated by the second plurality of circumferentially distributed infrared heating elements during rotation of the sealing die and production of said pockets, and wherein the temperature control system is configured to control the output of the first and second pluralities of circumferentially distributed infrared heating elements of the sealing die based on temperature measurements taken by the temperature sensor.

7. Packaging apparatus as claimed in claim 1, wherein the infrared heating elements each comprise a short wave carbon infrared element in a quartz glass tube.

8. Packaging apparatus as claimed in claim 7, wherein the short wave carbon infrared element is configured to emit infrared radiation with a wavelength in the range 0.7 µm-3.0 µm.

9. Packaging apparatus comprising two counter-rotatable sealing dies for pressing together two tissue webs to produce pockets for containing a substance for preparing beverages and to seal around said pockets, and two heating drums for heating the sealing dies and each being positioned inside a respective sealing die, wherein each heating drum comprises a plurality of circumferentially arranged infrared emitters, wherein the infrared emitters each comprise a short wave carbon infrared element in a quartz glass tube.

10. Packaging apparatus as claimed in claim 9, wherein the short wave carbon infrared element is configured to emit infrared radiation with a wavelength in the range 0.7 µm-3.0 µm.

11. A method for packaging a substance for preparing beverages, the method comprising:
counter-rotating two sealing dies;
heating, by a respective heating drum, each one of said two counter-rotating sealing dies;
  pressing, by the two counter-rotating sealing dies, two tissue webs together to produce pockets for containing the substance; and
  sealing, by the two counter-rotating sealing dies, around the outside of said pockets;
  wherein a first heating zone of each heating drum comprises a first plurality of circumferentially distributed infrared heating elements, and a second heating zone of each heating drum comprises a second plurality of circumferentially distributed infrared heating elements.

12. A method as claimed in claim 11, wherein the infrared heating elements in the second plurality of circumferentially distributed infrared heating elements are axially offset from the infrared heating elements in the first plurality of circumferentially distributed infrared heating elements.

13. A method as claimed in claim 11, wherein the infrared heating elements in the second plurality of circumferentially distributed infrared heating elements are circumferentially offset from the infrared heating elements in the first plurality of circumferentially distributed infrared heating elements.

14. A method as claimed in claim 11, further comprising independently controlling, by a temperature control system, the first and second plurality of circumferentially distributed infrared heating elements.

15. A method as claimed in claim 14, wherein the temperature control system independently controls the first and second plurality of circumferentially distributed infrared heating elements such that a heat output from one of said pluralities is greater than a heat output from the other of said pluralities.

16. A method as claimed in claim 14, further comprising measuring the temperature at a location on at least one of the sealing dies heated by its associated second plurality of circumferentially distributed infrared heating elements during rotation of the sealing die and a production of said pockets, and the temperature control system controlling the output of the first and second pluralities of circumferentially distributed infrared heating elements of the sealing die based on the temperature measurements taken by the temperature sensor.

17. A method as claimed in claim 11, wherein the infrared heating elements each comprise a short wave carbon infrared element in a quartz glass tube.

18. A method as claimed in claim 17, wherein the short wave carbon infrared element is configured to emit infrared radiation with a wavelength in the range 0.7 μm-3.0 μm.

19. A method as claimed in claim 11, further comprising introducing said substance into the pockets to produce bags containing the substance.

20. A method as claimed in claim 19, wherein the substance comprises tea leaves and the bags are tea bags.

* * * * *